(12) United States Patent
Fong

(10) Patent No.: US 7,932,960 B1
(45) Date of Patent: Apr. 26, 2011

(54) INTEGRATOR ARRAY FOR HUD BACKLIGHTING

(75) Inventor: Ching Fong, Canton, MI (US)

(73) Assignee: Yazaki North America, Inc., Canton, MI (US)

( * ) Notice: Subject to any disclaimer, the term of this patent is extended or adjusted under 35 U.S.C. 154(b) by 485 days.

(21) Appl. No.: 12/059,371

(22) Filed: Mar. 31, 2008

(51) Int. Cl.
*G02F 1/1335* (2006.01)

(52) U.S. Cl. .............................. 349/11; 349/61; 349/62

(58) Field of Classification Search ................ 349/11, 349/61, 62
See application file for complete search history.

(56) References Cited

U.S. PATENT DOCUMENTS

| | | | |
|---|---|---|---|
| 4,987,410 A | 1/1991 | Berman et al. | |
| 5,008,658 A | 4/1991 | Russay et al. | |
| 5,657,163 A * | 8/1997 | Wu et al. | 359/630 |
| 5,709,463 A * | 1/1998 | Igram | 362/268 |
| 6,906,836 B2 * | 6/2005 | Parker et al. | 359/15 |
| 6,979,094 B1 | 12/2005 | Venkatram | |
| 7,273,291 B2 | 9/2007 | Kim et al. | |
| 7,300,183 B2 * | 11/2007 | Kiyomoto et al. | 362/297 |

* cited by examiner

*Primary Examiner* — Mike Qi
(74) *Attorney, Agent, or Firm* — Harness, Dickey & Pierce, P.L.C.

(57) ABSTRACT

An system for providing uniform and focused backlighting to a liquid crystal display (LCD) can be provided. The system can include at least one light source that emits light rays. The system can include at least one column having a first end positioned adjacent to the at least one light source, a second end adapted to be positioned adjacent to the LCD and a plurality of walls. The system can include an optical receptor coupled to the first end of the at least one column, which can include an angled side wall that can be coupled to the walls of the at least one column. The light rays from the at least one light source can be totally internally reflected by the angled side wall and walls to create at least one virtual light source to backlight the LCD.

20 Claims, 4 Drawing Sheets

INTEGRATOR ARRAY FOR HUD BACKLIGHTING

INTRODUCTION

The present disclosure generally relates to display backlighting, and more particularly to a system and method for an integrator array for backlighting a heads-up display (HUD) in a motor vehicle.

Traditionally, HUDs are employed in motor vehicles to display information regarding the operation of the motor vehicle in a line of site of an operator. For example, the HUD can display a speed of the motor vehicle, a radio station playing on a stereo of the motor vehicle or even a live image from the night vision camera. The image of the HUD is typically located at a position sufficiently far from the driver such that the driver's eyes can see clearly both the HUD image and the road afar simultaneously. Thus, the HUD can enable the operator to obtain important information regarding the current operation of the motor vehicle without diverting his or her eyes to look at gages on an instrument panel.

Generally, the information displayed by the HUD can be projected by a backlit display. For example, a liquid crystal display (LCD) can be used to generate the data displayed by the HUD, which can then be backlit by a suitable lighting system. As the HUD is placed a great distance from the driver's eyes, in order for the HUD image to be sufficiently bright, the light coming out of the LCD needs to be highly concentrated or focused.

A system for providing spatially uniform and angularly focused backlighting to a liquid crystal display is provided. The system can include at least one light source that emits a plurality of light rays. The system can also include at least one column having a first end positioned adjacent to the at least one light source, a second end adapted to be positioned adjacent to the liquid crystal display and a plurality of walls. The system can further include an optical receptor coupled to the first end of the at least one column. The optical receptor can include a centrally-positioned inner lens and an angled side wall that can be coupled to the plurality of walls of the at least one column. Some of the plurality of light rays from the at least one light source can have a small angle relative to the main optical axis, and can be collimated by the inner lens. Some of the plurality of light rays from the at least one light source can have an angle big enough to miss the inner lens, and can be totally internally reflected by the angled side wall and plurality of walls and in this process can be collimated. With the combination of the inner lens, the angled side walls and plurality of walls, a majority of the plurality of light rays entering the integrator array can be collimated to create angularly focused backlighting. The total internal reflection by the walls can create at least one virtual light source to backlight the liquid crystal display.

Further provided is a system for providing uniform and focused backlighting to a liquid crystal display. The system can include a plurality of columns. Each column can have a first end, a second end, and four walls extending between the first and second ends. Each wall can diverge outwardly from the first end such that the columns can be spaced apart at the first end and are operable to be coupled together at the second end. The system can also include an optical receptor positioned at the first end of each column. Each optical receptor can have an outer angled side wall that can merge into the four walls and a centrally-positioned inner lens. Light rays entering each column at the first end can be reflected by the angled side wall, the lens and four walls to remain within a space defined by the column.

A system for providing uniform and focused backlighting to a liquid crystal display is provided. The system can include a plurality of light sources that emit a plurality of light rays. The system can also include a plurality of columns arranged in parallel rows. Each column can have a first end, a second end, and four walls extending between the first and second ends that diverge outwardly from the first end such that the columns can be spaced apart at the first end and adjacent to each other at the second end. The system can further include an optical receptor coupled to the first end of each column and positioned adjacent to one of the plurality of light sources. Each optical receptor can have an outer angled side wall coupled to the four walls and a centrally-positioned inner lens. The system can further include a liquid crystal display that displays a message. The liquid crystal display can be positioned adjacent to the second ends of the plurality of columns. The plurality of light rays from the plurality of light sources can be totally internally reflected by the angled side wall and plurality of walls to create a plurality of virtual light sources and the angled sidewall, four walls and inner lens cooperate to provide spatially uniform backlighting of the liquid crystal display.

Further areas of applicability of the present teachings will become apparent from the detailed description provided hereinafter. It should be understood that the description and specific examples, while indicating various embodiments of the present teachings, are intended for purposes of illustration only and are not intended to limit the scope of the present teachings.

BRIEF DESCRIPTION OF THE DRAWINGS

The present teachings will become more fully understood from the detailed description and the accompanying drawings, wherein.

DETAILED DESCRIPTION

The following description of various embodiments is merely exemplary in nature and is in no way intended to limit the present teachings. Although the following description is related generally to an integrator array for backlighting a liquid crystal display (LCD) for use with a head's up display (HUD) of a motor vehicle, it will be understood that the integrator array, as described and claimed herein, can be used in combination with any appropriate system or device where it is desirable to backlight a display using a concentrated beam of light, such as a virtual reality display. Therefore, it will be understood that the following discussions are not intended to limit the scope of the appended claims.

Figure 1:
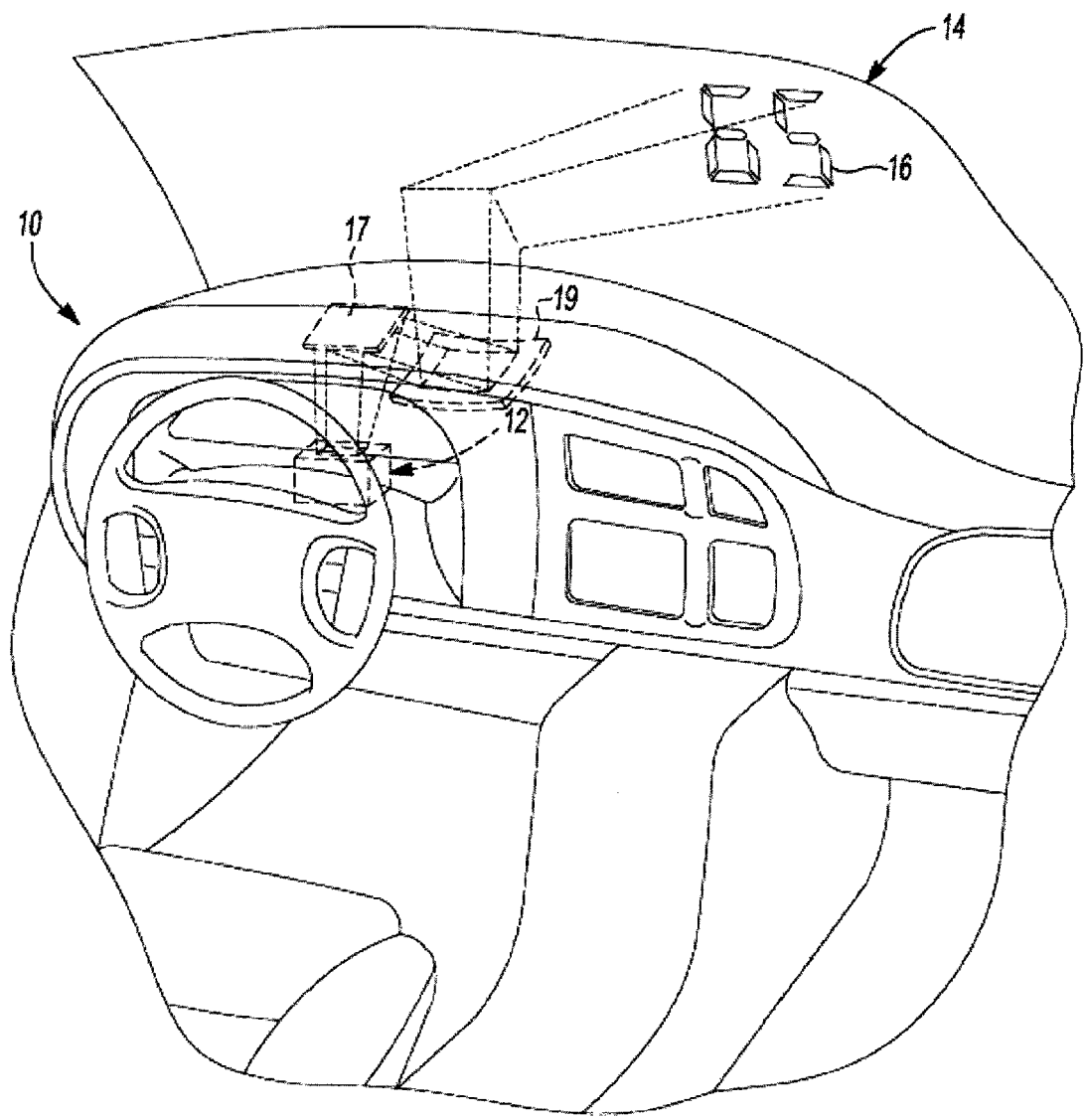
FIG. 1 is an environmental view of an exemplary heads-up display (HUD) system that includes an integrator array according to various teachings.

With reference to FIG. 1, an exemplary portion of a motor vehicle 10 is shown. The motor vehicle 10 can include a HUD system 12 and a windshield 14. The HUD system 12 can project one or more virtual images of the messages 16. The messages 16 can be projected onto a fold mirror 17, and an aspheric mirror 19 to project the final image of the message 16 sufficiently far away from the driver so that the driver can see clearly both the messages 16 and the road substantially simultaneously. The messages 16 can include data related to the operation of the motor vehicle 10, such as a speed of the motor vehicle 10, a radio station playing on a stereo of the motor vehicle 10, or night vision images from night vision camera onboard the motor vehicle 10. It should be noted that the message 16 can comprise one or more messages comprised of any combination of alpha/numeral characters and graphic images. The HUD system 12 can project the messages 16 at a high brightness or luminescence onto the windshield 14. The HUD system 12 can efficiently project the messages 16 such that the operator of the motor vehicle 10 can read the messages 16 without changing a position of his or her eyes relative to the windshield 14.

Figure 2:
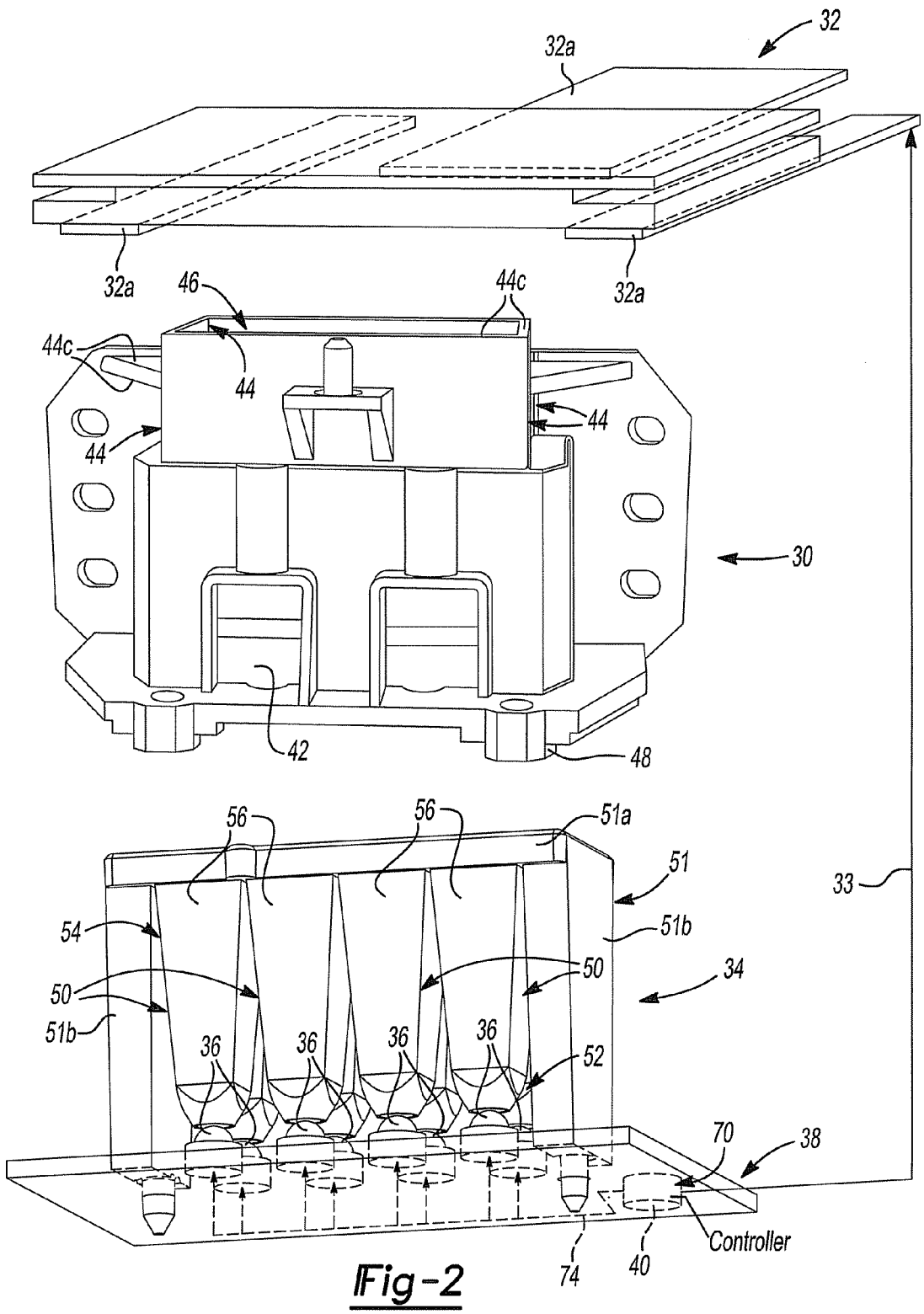
FIG. 2 is a partially exploded view of the HUD system of FIG. 1 that includes the integrator array.

With reference to FIGS. 1 and 2, the HUD system 12 can include a housing 30, a liquid crystal display (LCD) 32, an integrator array 34, one or more light sources 36, a printed circuit board (PCB) 38 and a controller 40.

The housing 30 can include an aperture 42, one or more walls 44, a first end 46 and a second end 48. In addition, the housing 30 can include one or more features that facilitate the coupling of the housing 30 to the motor vehicle 10. The housing 30 can be composed of any suitable material, such as a metal, metal alloy, polymer or combinations thereof. The aperture 42 of the housing 30 can receive the integrator array 34. The walls 44 can surround and define the aperture 42, and can include one or more supports to support the integrator array 34, if desired. If employed, the supports can suspend the integrator array 34 above the light sources 36 and the PCB 38. The first end 46 of the housing 30 can be adjacent to the LCD 32. Generally, the ends 44c of the walls 44 can be configured to support the LCD 32 over the integrator array 34. The second end 48 of the housing 30 can be coupled to the PCB 38.

The liquid crystal display (LCD) 32 can be received onto the first end 46 of the housing 30 so that the LCD 32 can be adjacent to the integrator array 34. Generally, the LCD 32 can be overlaid or positioned substantially over the integrator array 34 by the housing 30 so that the integrator array 34 can serve to backlight the LCD 32. In addition, the LCD 32 can include circuitry 32a that can receive the messages 16 from the controller 40. The LCD 32 can be a monochrome or a full color LCD as generally known in the art. Briefly the circuitry 32a of the LCD 32 can be in communication with and responsive to the controller 40 to receive at least one control signal 33 that comprises the message 16 as will be discussed. Based on the control signal 33, the LCD 32 can generate the message 16 (FIG. 1).

Figure 3:
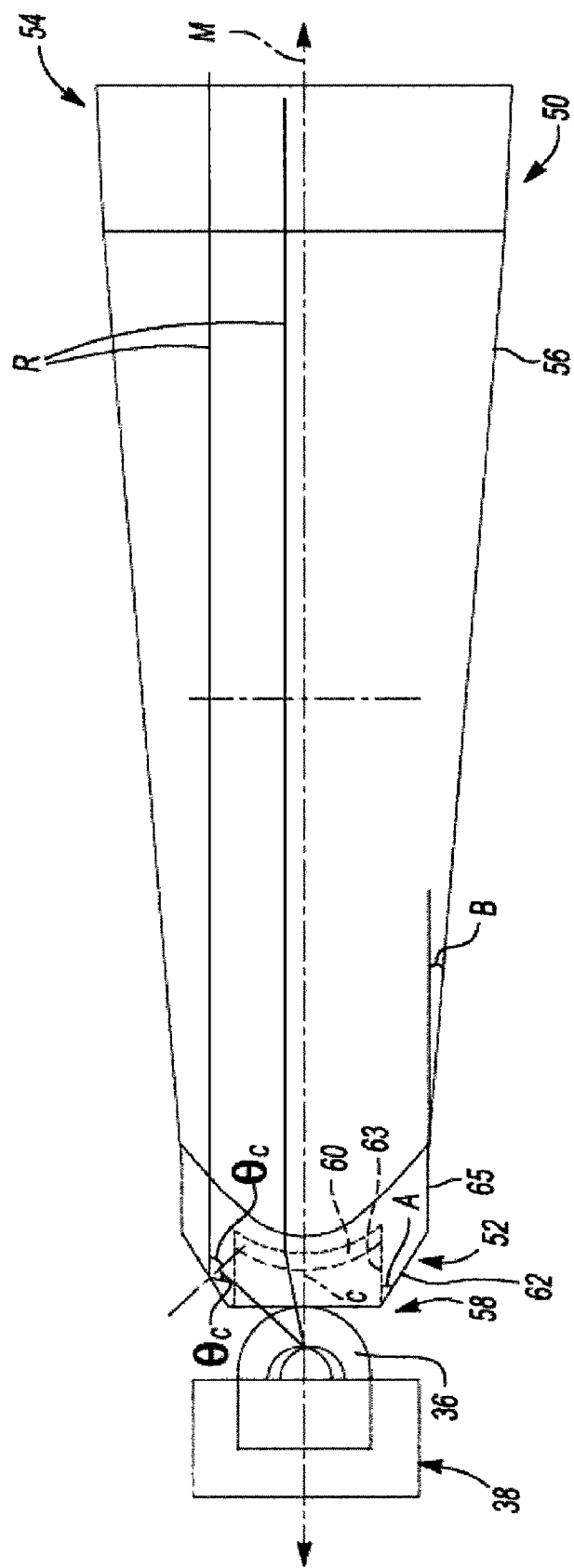
FIG. 3 is a side view of the integrator array of FIG. 2.
Figure 4:
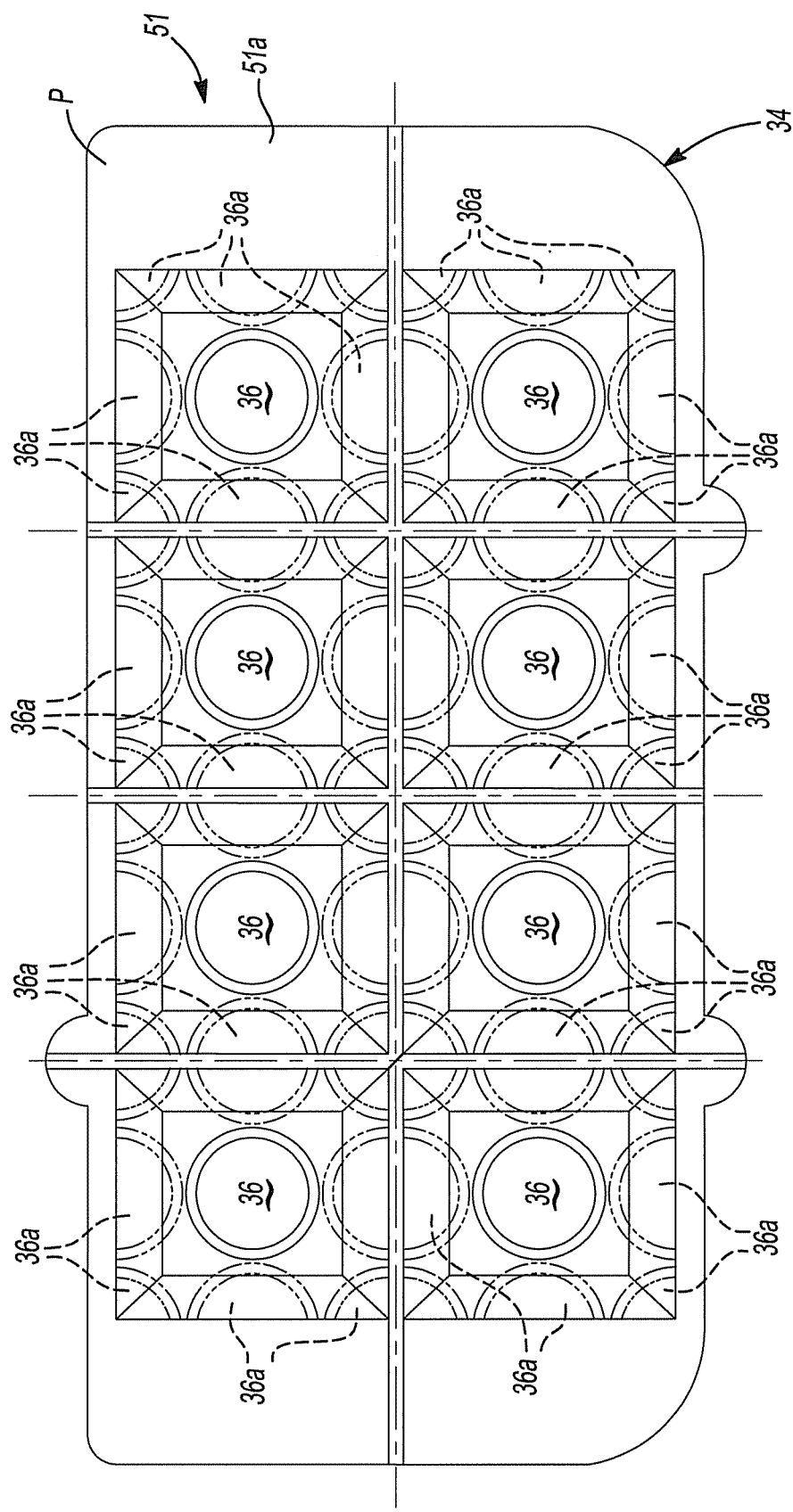
FIG. 4 is a top plan view of a portion of the HUD system of FIG. 1, illustrating the backlighting produced by the integrator array.

With reference to FIGS. 1-3, the message 16 displayed on the LCD 32 can be backlit by the integrator array 34. The integrator array 34 can be composed of any suitable transparent material that can withstand the heat generated by surrounding electronic components. Generally, the integrator array 34 can be composed of a material that has a refractive index greater than a refractive index of air, which is 1.0. For example, the integrator array 34 can be composed of ZEONEX®, manufactured by Zeon Corporation of Tokyo, Japan, which has a refractive index of 1.53, polycarbonate (refractive index of 1.59) or polymethylmethacrylate (PMMA; refractive index of 1.49), if desired. With reference to FIG. 3, light rays R from the light sources 36 can contact the integrator array 34 at angles larger than the critical angle θc to enable total internal reflection within the integrator array 34 so that all of the light rays R contacting the integrator array 34 can be reflected, as will be discussed. The total internal reflection of the light rays R can result in each light source 36 being mirrored by the integrator array 34, which as shown in FIG. 4, can thereby create a virtual light source 36a. The use of the light sources 36 and the virtual light sources 36a can serve to backlight the LCD 32 with spatially uniform lighting.

With reference to FIGS. 2-4, the integrator array 34 can include at least one or a plurality of columns 50 and a support structure 51. The columns 50 can be arranged in one or more rows. For example, the integrator array 34 can comprise eight columns 50, arranged in two parallel rows of four columns 50. It will be understood, however, that the columns 50 can be arranged in any desired configuration. Each column 50 can include a first or proximal end 52, a second or distal end 54 and one or more walls 56. With reference to FIG. 3, each column 50 can also define a centerline, which can also comprise a main optical axis M for the transmission of light rays R from the light source 36, as will be discussed.

The proximal end 52 of each column 50 can be positioned adjacent to a respective one of the light sources 36 and can include an optical receptor 58 having a lens 60, an angled or cylindrical side wall 62 and a straight side wall 65. The lens 60 can be disposed within an opening 63 in the optical receptor 58 with the side walls 62, 65 surrounding the lens 60. The lens 60 can comprise a convex lens having a central axis C, which can be aligned with the main optical axis M of the light source 36. The light rays R entering the lens 60 from the light source 36 can be slightly bent by the lens 60 so as to be directed towards the distal end 54 of the column 50. Generally, the light rays R either extend without further obstruction towards the distal end 54 of the column 50 or reflect once internally (e.g., reflect off walls 56). In other words, the light rays R can be slightly bent by the lens 60 such that the light rays R can contact the walls 56 at an angle larger than the critical angle θc to enable the total internal reflection of the light rays R in a direction substantially parallel to the main optical axis M.

Certain of the light rays R, however, are not received at the lens 60 and are instead directed toward walls of the opening 63. The refractive index of the opening 63 causes the light rays R to be directed towards the angled side wall 62 surrounding the lens 60. The side wall 62 can have an angle A relative to the opening 63. The angle A can be selected to enable the light rays R from the light source 36 to contact the side wall 62 at an angle larger than the critical angle θc to facilitate the total internal reflection of the light rays R in a direction that is nearly parallel to the main optical axis M. The angle A can be dependent upon the material that comprises the integrator array 34, but can generally be a steep angle, such as an angle between about 20 degrees and about 80 degrees. The side wall 62 can be coupled to the side wall 65, which can, in turn, couple the optical receptor 58 to the walls 56 of the column 50. In this way, the light rays R from the light source 36 can be received within the column 50 and directed substantially parallel to the main optical axis M for uniform and focused backlighting of the LCD 32.

The distal end 54 of the column 50 can be positioned adjacent to the LCD 32 when the HUD system 12 is assembled. The distal end 54 of the columns 50 can be coupled to the support structure 51. With reference to FIG. 3, the walls 56 can couple the proximal end 52 to the distal end 54, and can generally diverge outward from the proximal end 52 to the distal end 54 about or around the main optical axis M. For example, the walls 56 can diverge outwardly from the side wall 65 at an angle B relative to the side wall 65. The angle B can generally range from about 0 to about 89.9 degrees, and can be selected such that the columns 50 can be coupled to the support structure 51 at the distal end 54. For example, the walls 56 can diverge such that the proximal ends 52 of the integrator array 34 are spaced apart, while the distal ends 54 of the integrator array 34 are adjacent to each other to be coupled to the support structure 51 as shown in FIGS. 2 and 4. It will be understood, however, that the walls 56 and side wall 65 can extend along the same plane (i.e., no divergence), or the side wall 65 can be angled relative to the walls 56, and thus, the divergence of the walls 56 relative to the side wall 65 as illustrated and described herein is merely exemplary and is not intended to limit the present teachings.

The support structure 51 can include a flange 51a and one or more support legs 51b. The flange 51a can be coupled to or integrally formed from the distal ends 54 of the columns 50. The flange 51a can define a planar surface P for receipt of the LCD 32 thereon. The support legs 51b can extend from the flange 51a and can couple the flange 51a to the PCB 38.

With reference to FIGS. 2-4, the light sources 36 can comprise any light emitting device, such as a light emitting diode (LED). The light sources 36 can each comprise a single colored LED or a red-green-blue (RGB) LED, if desired. The light sources 36 can be positioned adjacent to the proximal end 52 of the integrator array 34 to direct the light into the integrator array 34. Generally, the number of light sources 36 can be equal to the number of columns 50 in the integrator array 34, such that one light source 36 can be positioned adjacent to the proximal end 52 of each column 50. The light sources 36 can be responsive to one or more signals from the controller 40 to output the light rays R.

With reference to FIG. 2, each of the light sources 36 can be coupled to the PCB 38. The PCB 38 can include circuitry required to selectively illuminate the light sources 36, and can include a power source (not shown). The controller 40 can be coupled to and in communication with the PCB 38. The controller 40 can also be in communication with the LCD 32. As used herein, the term controller refers to an application specific integrated circuit (ASIC), an electronic circuit, a processor (shared, dedicated, or group) and memory that execute one or more software or firmware programs, a combinational logic circuit, or other suitable components that provide the described functionality. With reference to FIGS. 1 and 2, the controller 40 can receive as input a signal 70 indicative of one or more operating conditions associated with the motor vehicle 10 for display by the HUD system 12. Based on the signal 70, the controller 40 can set the control signal 33 for the LCD 32, and can also set a lighting signal 74 to illuminate the light sources 36 coupled to the PCB 38.

The control signal 33 can comprise the message 16 for display on the LCD 32. The light signal 74 can comprise a signal transmitted on the PCB 38 to illuminate the light sources 36 to backlight the LCD 32. With reference to FIGS. 2-4, once the light sources 36 are illuminated, the light rays R from the light sources 36 can be totally internally reflected by the integrator array 34 to produce spatially uniform backlighting for the LCD 32.

Thus, the HUD system 12 can provide the operator of the motor vehicle 10 with one or more messages 16 that can be projected onto the windshield 14 (FIG. 1). The integrator array 34 can create virtual light sources 36a through the total internal reflection of the light rays R emitted by the light sources 36 (FIG. 4). The creation of the virtual light sources 36a along with the light sources 36 can result in spatially uniform backlighting for the LCD 32. In addition, the integrator array 34 can focus or concentrate the light rays R from the light sources 36 such that the light rays R can exit the distal end 54 of the integrator array 34 within about 0.0 to about 3.5 degrees of the main optical axis M (FIG. 3).

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this invention, but that the scope of the present disclosure will include any embodiments falling within the foregoing description and the appended claims.

For example, while the HUD system 12 has been described as including an LCD 32 that enables the display of data to the operator of the motor vehicle 10, those of skill in the art will appreciate that the present disclosure, in its broadest aspects, may be constructed somewhat differently. For example, the messages 16 could be formed on a template that is overlaid onto the common plane P of the integrator array 34, and the light sources 36 could be used to illuminate the messages 16 depending upon the status of the motor vehicle 10. For instance, the graphical message overlay could include an illustration of the fuel tank, and the light sources 36 can be used to illuminate the fuel tank illustration to notify the operator of the motor vehicle 10 that the fuel tank is almost empty, in one example.

What is claimed is:

1. An integrator array providing uniform and focused backlighting to a liquid crystal display, the integrator array comprising:
    at least one light source that emits a plurality of light rays;
    at least one tapered column corresponding to each light source, each column having a first, narrowed end positioned adjacent to the light source, a second, widened end positioned adjacent to the liquid crystal display, and a plurality of walls extending between the first and second ends; and
    an optical receptor secured between the light source and the first end of the at least one column having an angled side wall coupled to the plurality of walls of the at least one column, wherein the plurality of light rays from the at least one light source are reflected by the optical receptor to create at least one virtual light source to backlight the liquid crystal display.

2. The integrator array of claim 1, wherein the at least one light source is positioned on a printed circuit board adjacent to the first end of the integrator array.

3. The integrator array of claim 2, further comprising:
    a housing adapted to support the liquid crystal display, the housing surrounds the at least one column; and
    a support structure received within the housing that includes a flange coupled to the second end of the at least one column and at least one support leg coupled to the flange wherein the printed circuit board is operable to receive a portion of the at least one support leg to couple the support structure to the printed circuit board.

4. The integrator array of claim 1, wherein the at least one column is a transparent material having a refractive index greater than 1.0.

5. The integrator array of claim 1, further comprising a center optical axis that extends longitudinally along the at least one column.

6. The integrator array of claim 5, wherein the optical receptor further comprises an inner lens that is centrally-positioned about the center optical axis.

7. The integrator array of claim 6, wherein the inner lens of the optical receptor is a convex lens operable to bend and collimate the plurality of light rays that enter the convex lens.

8. The integrator array of claim 6, wherein the plurality of light rays that enter the first end of each of the columns are reflected and collimated to remain within the at least one column and substantially parallel to the center optical axis.

9. An integrator array for providing uniform and focused backlighting to a liquid crystal display comprising:
a plurality of light sources that emit a plurality of light rays;
a plurality of columns corresponding in number to the plurality of light sources, each column having a first end, a second end, and four walls extending between the first and second ends, each wall diverging outwardly from the first end such that the columns are spaced apart at the first end and are coupled together at the second end; and
an optical receptor positioned between each light source and the first end of each column, each optical receptor having an outer angled side wall that merges into the four walls and a centrally-positioned inner lens, whereby light rays from each light source entering each column at the first end are reflected by at least one of the angled side wall, inner lens and four walls to remain within a space defined by the column.

10. The integrator array of claim 9, further comprising:
a printed circuit board that includes the plurality of light sources, with one of each of the plurality of light sources positioned adjacent to each first end of the plurality of columns;
a support structure including a flange coupled to the second end of each of the plurality of columns and at least one support leg operable to be coupled to the printed circuit board; and
a liquid crystal display positioned on a common plane formed by the flange.

11. The integrator array of claim 10, wherein the plurality of light rays create at least one virtual light source to backlight the liquid crystal display.

12. The integrator array of claim 9, wherein the inner lens of the optical receptor is centrally-positioned about a center optical axis.

13. The integrator array of claim 12, wherein the light rays are reflected such that the light rays remain between about 0.0 to about 3.5 degrees of the center optical axis.

14. The integrator array of claim 9, wherein the inner lens of the optical receptor is a convex lens.

15. An integrator array for providing uniform and focused backlighting to a liquid crystal display comprising:
a plurality of light sources that emit a plurality of light rays;
a plurality of columns arranged in parallel rows, each column having a first end, a second end, and four walls extending between the first and second ends that diverge outwardly from the first end such that the columns are spaced apart at the first end and adjacent to each other at the second end;
an optical receptor positioned between the first end of each column and one of the plurality of light sources, each optical receptor having an angled side wall coupled to the four walls and a centrally-positioned inner lens coupled to the angled side wall;
a liquid crystal display that displays a message, the liquid crystal display positioned adjacent to the second ends of the plurality of columns; and
wherein the plurality of light rays from the plurality of light sources are totally internally reflected by the angled side wall and four walls to create a plurality of virtual light sources, and wherein the angled side wall, four walls, and inner lens cooperate to provide spatially uniform and angularly focused backlighting of the liquid crystal display.

16. The integrator array of claim 15, wherein the four walls diverge about a center optical axis that extends longitudinally along each of the plurality of columns.

17. The integrator array of claim 16, wherein the plurality of light rays entering each column at the first end are reflected within the column so as to be substantially parallel to the center optical axis.

18. The integrator array of claim 16, wherein the inner lens of the optical receptor is centrally-positioned about the center optical axis.

19. The integrator array of claim 15, further comprising:
a support structure that includes a flange and at least one support leg, the flange coupled to the second ends of the plurality of columns to receive the liquid crystal display and the at least one support leg adapted to couple the integrator array to a printed circuit board.

20. The integrator array of claim 15, wherein the inner lens of the optical receptor comprises a convex lens.

* * * * *